United States Patent
Kilgard

(10) Patent No.: US 7,286,129 B1
(45) Date of Patent: *Oct. 23, 2007

(54) TWO-SIDED STENCIL TESTING SYSTEM AND METHOD

(75) Inventor: Mark J. Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 10/853,795

(22) Filed: May 24, 2004

Related U.S. Application Data

(63) Continuation of application No. 09/939,000, filed on Aug. 24, 2001, now Pat. No. 6,778,189.

(51) Int. Cl.
    G06T 15/50 (2006.01)
(52) U.S. Cl. ..................................... 345/426
(58) Field of Classification Search ................ 345/426
    See application file for complete search history.

(56) References Cited

U.S. PATENT DOCUMENTS

| | | |
|---|---|---|
| 5,684,939 A | 11/1997 | Foran et al. |
| 5,831,620 A | 11/1998 | Kichury, Jr. |
| 6,072,500 A | 6/2000 | Foran et al. |
| 6,118,452 A | 9/2000 | Gannett |
| 6,154,223 A | 11/2000 | Baldwin |
| 6,226,003 B1 | 5/2001 | Akeley |
| 6,278,645 B1 | 8/2001 | Buckelew et al. |
| 6,384,822 B1 * | 5/2002 | Bilodeau et al. .......... 345/422 |
| 6,597,357 B1 * | 7/2003 | Thomas .................... 345/426 |
| 6,597,363 B1 | 7/2003 | Duluk et al. |
| 6,778,189 B1 * | 8/2004 | Kilgard .................... 345/611 |

OTHER PUBLICATIONS

Bergeron, "A General Version of Crow's Shadow Volumes," IEEE Computer Graphics and Applications, Sep. 1986.
Heidmann, "Real Shadows in Real Time," IRIS Universe, (18) pp. 28-31, 1991.
Crow, "Shadow Algorithms for Computer Graphics," Computer Graphics, 11(2), pp. 442-448, Summer, 1977.
Segal et al., The Open GL® Graphics System: A Specification (Version 1.3), Aug. 14, 2001, Mountain View, California.

* cited by examiner

*Primary Examiner*—Kee M. Tung
*Assistant Examiner*—Aaron M Richer
(74) *Attorney, Agent, or Firm*—Cooley Godward Kronish LLP

(57) ABSTRACT

A system, method and computer program product are provided for two-sided stencil testing during graphics processing. Initially, primitives are received to be processed in a graphics processing pipeline. In use, it is then determined whether the graphics processing pipeline is operating with same-sided stencil testing enabled. If same-sided stencil testing is not enabled, the primitives are passed without same-sided stencil testing and two-sided stencil testing. If, on other hand, same-sided stencil testing is enabled, it is determined whether the graphics processing pipeline is operating with two-sided stencil testing enabled. If the two-sided stencil testing is enabled and the same-sided stencil testing is enabled, two-sided stencil testing is performed on the primitives. If, on the other hand, the two-sided stencil testing is disabled and the same-sided stencil testing is enabled, same-sided stencil testing is performed on the primitives.

4 Claims, 7 Drawing Sheets

TWO-SIDED STENCIL TESTING SYSTEM AND METHOD

RELATED APPLICATIONS

This application is a continuation application of U.S. patent application Ser. No. 09/939,000 entitled, "Two-Sided Stencil Testing System And Method," filed on Aug. 24, 2001 now U.S. Pat. No. 6,778,189, the contents of which are hereby incorporated by reference in their entirety.

FIELD OF THE INVENTION

The present invention relates to computer graphics processing, and more particularly to stencil testing.

BACKGROUND OF THE INVENTION

A major objective in graphics rendering is to produce images that are so realistic that the observer believes the image is real. A fundamental difficulty in achieving total visual realism is the complexity of accurately representing real world visual effects. A scene can include a wide variety of textures, subtle color gradations, reflections, translucency, etc.

One important way to make images more realistic is to determine how objects in a scene cast shadows and then represent these shadows in the rendered image. Shadows enhance the realism of an image because they give a two-dimensional image a three-dimensional feel.

The addition of shadows to the rendering of a complex model can greatly enhance the understanding of that model's geometry. The human visual system uses shadows as a cue for depth and shape. Consequently, shadows are very useful for conveying the three dimensional nature of rendered objects and for adding realism to computer generated scenes.

Prior art FIG. 1 illustrates a scene 100 where shadowing is needed during processing in a graphics pipeline. As shown in FIG. 1, a particular scene 100 includes a light source 104, a light obstructing surface 102, and a plurality of objects 106. Due to the relative orientation of the light source 104, objects 106 and surface 102, a shadow should be shown on certain objects 106 where the surface 102 obstructs light from the light source 104.

The utilization of shadow volumes is a technique by which a graphics pipeline may determine which objects 106 in the scene 100 should be rendered with a shadow. In particular, a shadow bit is maintained for each pixel in a frame buffer which indicates whether the objects 106 are in or out of the shadow projected by the surface 102.

Since the shadow volume technique takes place in a frame buffer of a graphics pipeline, it may be referred to as an image space algorithm. While shadowing may be trivial in a scene with one obstructing surface 102, rendering may be complicated when multiple overlapping obstructing surfaces 102 exist.

Prior art FIG. 2 illustrates a scene 200 where shadowing is complicated by the involvement of multiple intersecting overlapping surfaces 102. In such more complex environments, a technique of "counting" is employed. As shown in Prior art FIG. 2, a plurality of obstructing surfaces 102 cast a plurality of shadow volumes each defined by a plurality of boundary primitives 202.

Such boundary primitives 202 are either front-facing or back-facing with respect to how they are viewed. In the context of the present description, a primitive is front-facing or back-facing based on whether the area of the primitive in screen space is positive or negative, or the ordering of vertices of the primitive is clockwise or counterclockwise. Note Prior art FIG. 2 where front-facing and back-facing primitives are designated with an "F" and "B," respectively.

Prior art FIG. 3 illustrates a method 300 for counting shadow volumes, in accordance with the prior art. Initially, in operation 302, a depth buffer and a stencil buffer are cleared after which the scene 200 is rendered with the light source 102 disabled during a first rendering pass. Once this pass is rendered, the color of all pixels in the frame buffer is as if every pixel were in shadow with respect to the light. Note operation 304. It should be noted that such operation affords a depth state of a closest object in the scene 200.

Next, in operation 306, primitives constituting the geometry of the scene's shadow volumes are drawn in the scene 200 during a second rendering pass. During the second pass, no color depth buffer writes take place in order to prevent disturbing results of the first rendering pass. Further, any back-facing shadow volume primitives are culled. For the remaining front-facing primitives, a per-pixel stencil value is incremented for each boundary between an eye position 206 and a subject object 204. This is accomplished by incrementing the per-pixel stencil value whenever the depth test passes. Since there are three front-facing primitive boundaries, such stencil value has the value of +3 after operation 306.

Next, in operation 308, shadow volume primitives are again drawn in the scene during a third rendering pass. Similar to the second pass, no color depth buffer writes take place in order to prevent disturbing results of the previous rendering passes. In operation 308, any front-facing primitives are culled. For the remaining back-facing primitives, a per-pixel stencil value is decremented for each boundary between the eye position 206 and the subject object 204. This is accomplished by decrementing the per-pixel stencil value whenever the depth test passes. Since there are three back-facing primitive boundaries, such stencil value has the value of "0" after operation 306.

The scene may then be rendered again during a fourth rendering pass in operation 310. During the fourth rendering pass, the light source 102 is enabled. Color writes are re-enabled for this rendering pass. Moreover, pixels are only updated if it is determined that the pixel is outside a shadow volume, as indicated by the stencil value being equal to "0." In the case of object 204 of Prior art FIG. 2, such associated pixels would be updated to show light. However, in the case of object 206, no light would be shown since the stencil value would be +2 so the stencil test fails which leaves the pixel unchanged from the initial shadowed rendering pass, etc.

One problem that results from the method 300 of Prior art FIG. 3 stems from the fact that the shadow volumes must be rendered twice during operations 306 and 308. The requirement that these rendering passes be separate operations 306 and 308 is prompted by the fact that traditional stencil value testing can not distinguish between front-facing and back-facing primitives. As such, the front-facing and back-facing primitives must be handled separately, in different rendering passes. This results in an efficiency problem that causes lower performance during graphics processing.

DISCLOSURE OF THE INVENTION

A system, method and computer program product are provided for two-sided stencil testing during graphics processing. Initially, primitives are received to be processed in a graphics processing pipeline. In use, it is then determined whether the graphics processing pipeline is operating with same-sided stencil testing enabled.

If same-sided stencil testing is not enabled, the primitives are passed without same-sided stencil testing and without two-sided stencil testing. If, on other hand, same-sided stencil testing is enabled, it is determined whether the graphics processing pipeline is operating with two-sided stencil testing enabled.

If the two-sided stencil testing is enabled and the same-sided stencil testing is enabled, two-sided stencil testing is performed on the primitives. If, on the other hand, the two-sided stencil testing is disabled and the same-sided stencil testing is enabled, same-sided stencil testing is performed on the primitives.

In one embodiment, the two-sided stencil testing may include determining whether the primitives are front-facing primitives or back-facing primitives. Further, stencil testing may be performed on the front-facing primitives utilizing a front set of stencil states. In a similar manner, the stencil testing may be performed on the back-facing primitives utilizing a back set of stencil states.

As an option, the front-facing primitives and back-facing primitives may include front-facing polygon primitives and back-facing polygon primitives, respectively. The front-facing primitives may also include front-facing non-polygon primitives. Moreover, the front-facing non-polygon primitives may include points, lines, bitmaps, and image rectangles.

In one aspect of the present embodiment, the stencil states may include stencil operations, reference values, compare masks, compare functions, and write masks.

In use, the two-sided stencil testing is performed in a single pass, thus contributing to the efficiency of the overall system. While the present technique has many applications, the two-sided stencil testing may be performed to facilitate a shadowing operation involving shadow volumes, in accordance with one embodiment.

One system, method and computer program product is provided for use of two-sided stencil testing during graphics processing including shadow volumes. Upon primitives representative of shadow volumes being received to be processed in a graphics processing pipeline, such primitives are rendered in a single rendering pass.

Such a single rendering pass includes determining whether the primitives are front-facing or back-facing. If the primitives are front-facing, a depth state is incremented. Moreover, if the primitives are back-facing, the depth state is decremented. A pixel may then conditionally be rendered with a shadow thereon based on a value of the depth state.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior art

Prior art

Prior art

DESCRIPTION OF THE PREFERRED EMBODIMENTS

Figure 1:
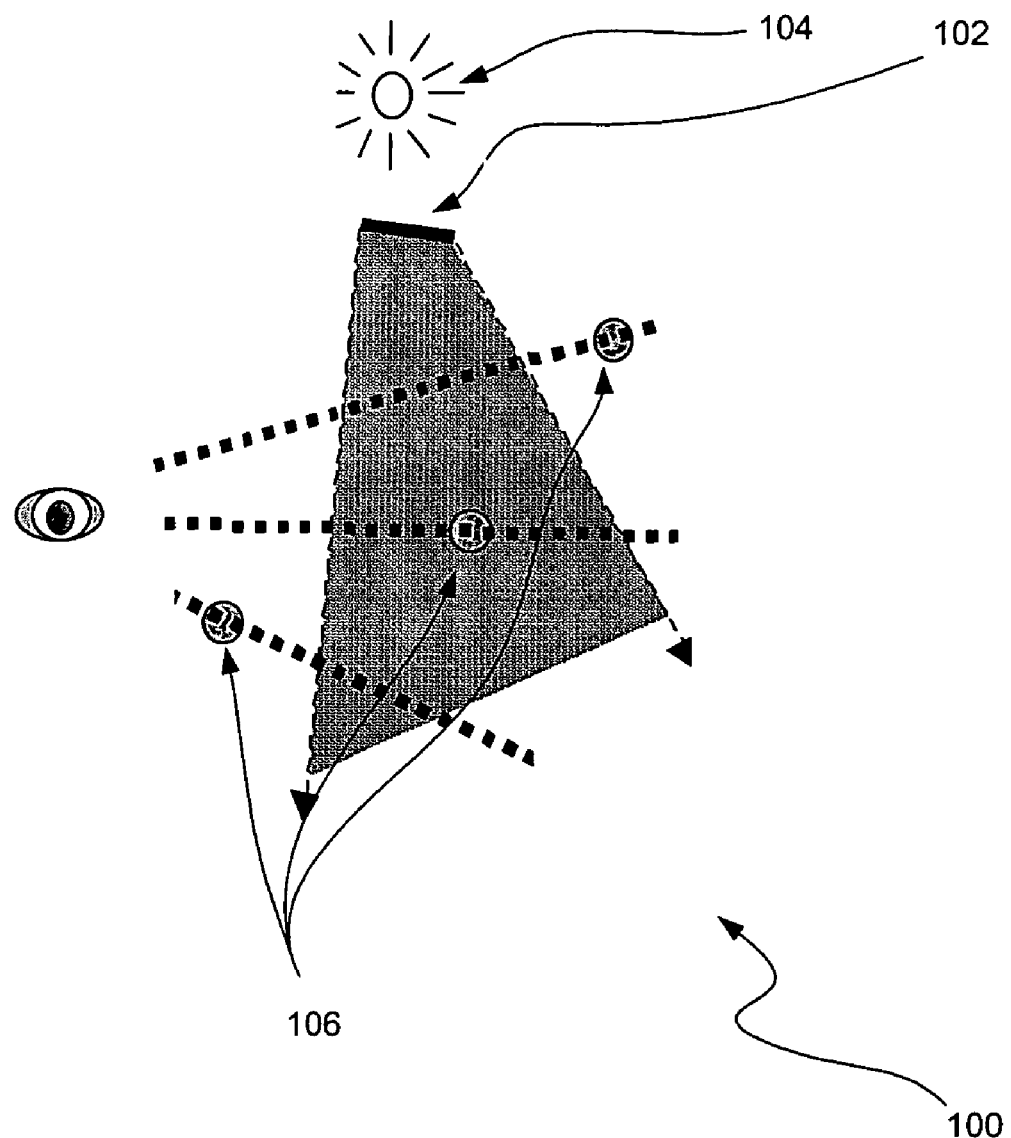
FIG. 1 illustrates a scene where shadowing is needed during processing in a graphics pipeline.
Figure 2:
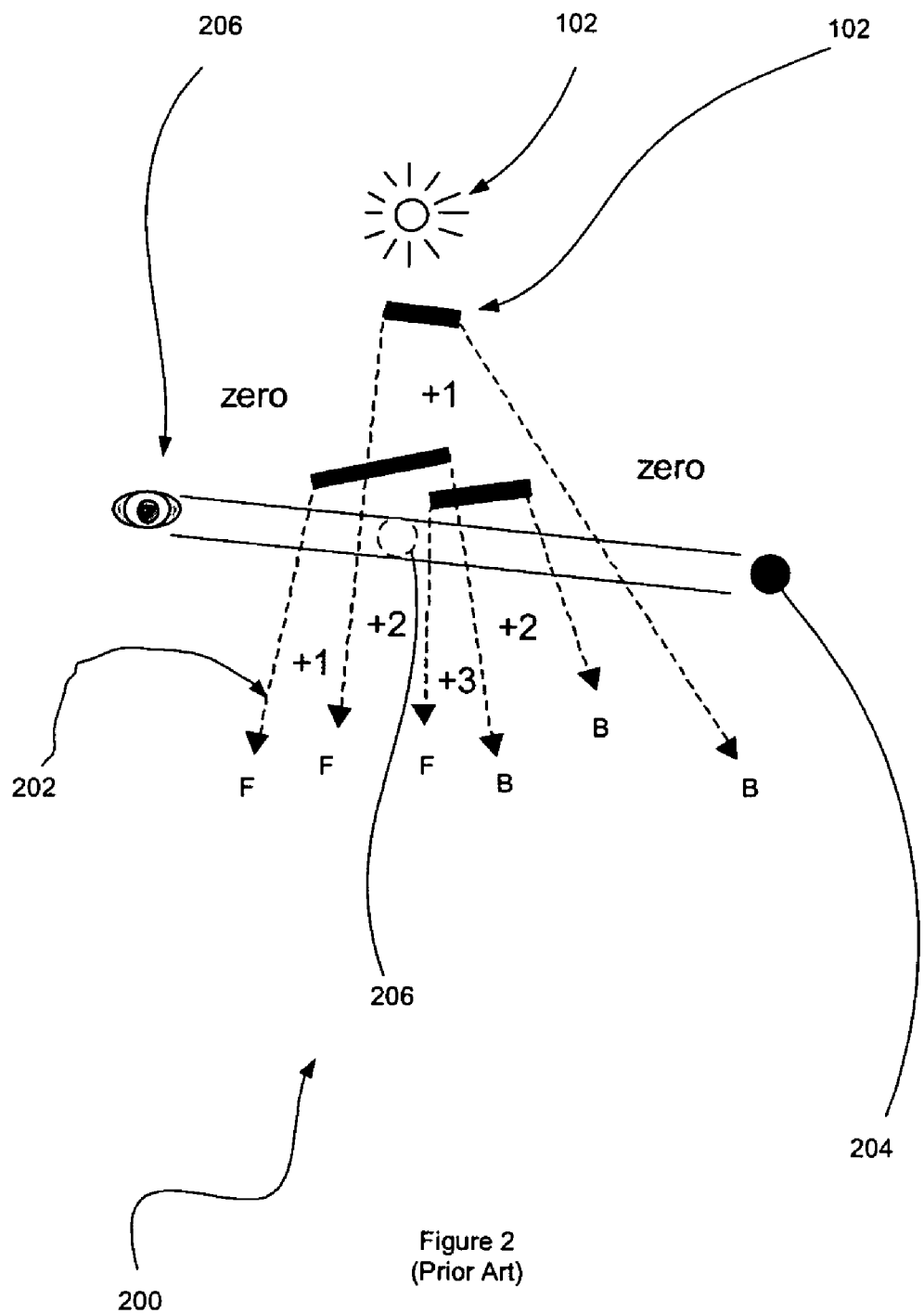
FIG. 2 illustrates a scene where shadowing is complicated by the involvement of multiple intersecting obstructing surfaces.
Figure 3:
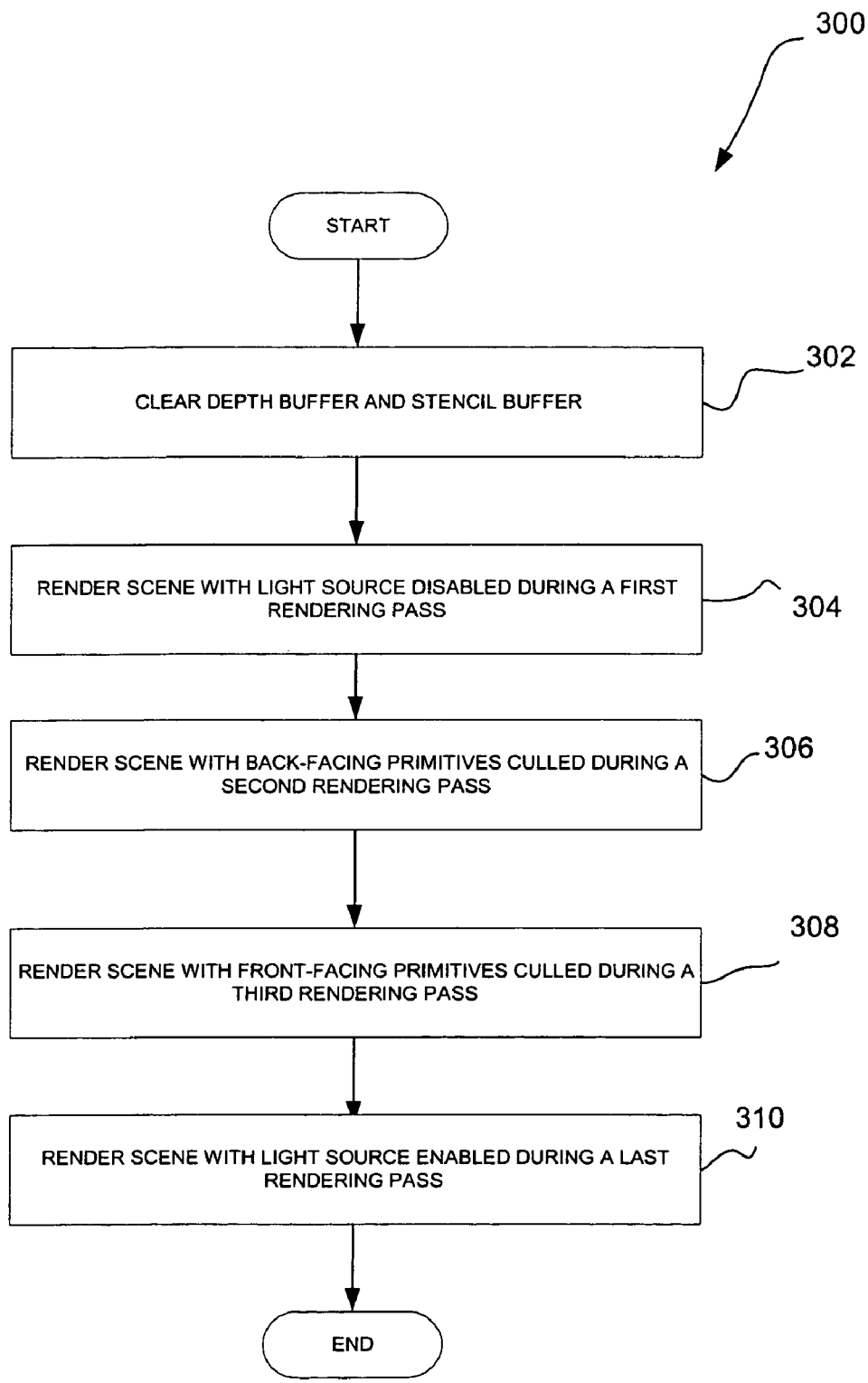
FIG. 3 illustrates a method for counting shadow volumes, in accordance with the prior art.
Figure 4:
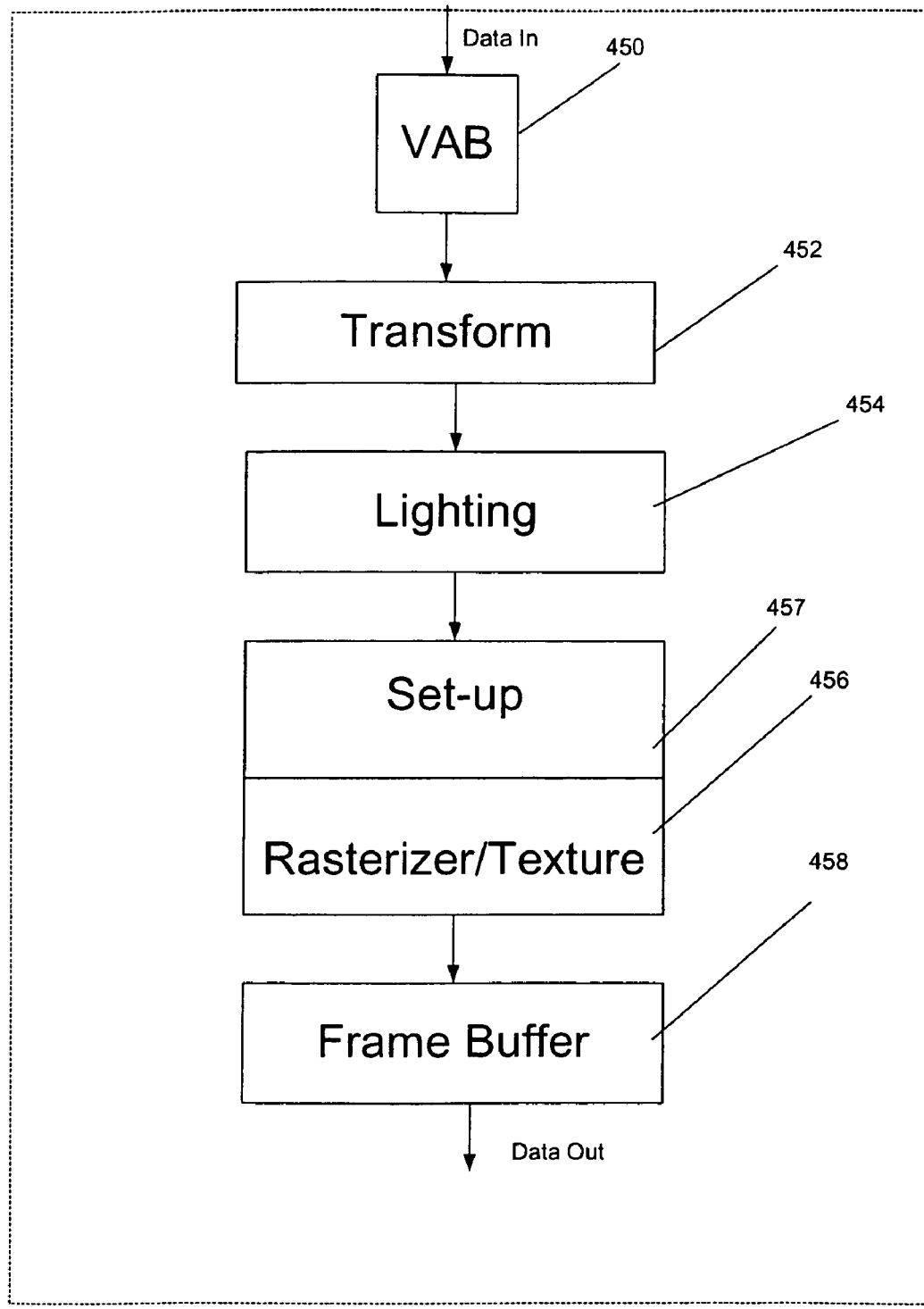
FIG. 4 is a system diagram illustrating the various components of one embodiment of the present invention.

FIGS. 1-3 illustrate the prior art. FIG. 4 is a system diagram illustrating the various components of one embodiment of the present invention. As shown, the present embodiment may be divided into a plurality of modules including a vertex attribute buffer (VAB) 450, a transform module 452, a lighting module 454, a rasterization/texturing module 456 with a set-up module 457, and a frame buffer 458.

In one embodiment, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

During operation, the VAB 450 is included for gathering and maintaining a plurality of vertex attribute states such as position, normal, colors, texture coordinates, etc. Completed vertices are processed by the transform module 452 and then sent to the lighting module 454. The transform module 452 generates vectors for the lighting module 454 to light.

The output of the lighting module 454 is screen space data suitable for the set-up module 457 which, in turn, sets up primitives. Thereafter, rasterization/texturing module 456 carries out rasterization and texturing of the primitives. Output of the rasterization/texturing module 456 is then sent to a frame buffer 458 for storage prior to being output to a display device (not shown).

In one embodiment, the present hardware implementation may at least partially employ the Open Graphics Library (OpenGL®) and Direct3D™ transform and lighting pipelines. OpenGL® is the computer industry's standard application program interface (API) for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Figure 5:
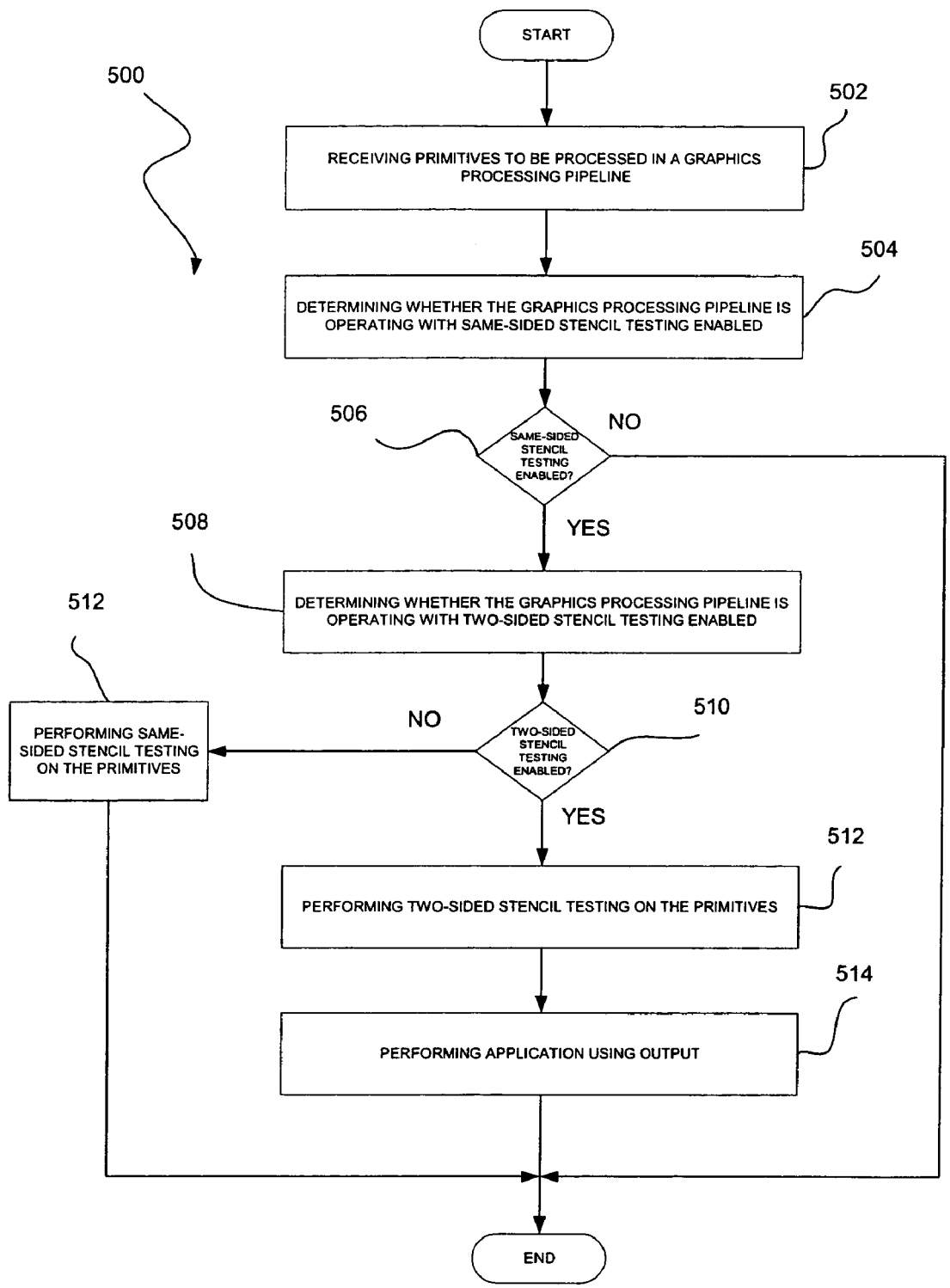
FIG. 5 illustrates a method for executing two-sided stencil testing during graphics processing, in accordance with one embodiment.

FIG. 5 illustrates a method 500 for two-sided stencil testing during graphics processing, in accordance with one embodiment. While the present method 500 is described in the context of the graphics pipeline shown in FIG. 4, it should be noted that the principles set forth herein may be implemented in any desired architecture. Initially, in operation 502, primitives are received to be processed in a graphics processing pipeline.

In use, it is determined whether the graphics processing pipeline is operating with same-sided stencil testing enabled.

Note operation 504. In the context of the present description, same-sided stencil testing refers to any type of stencil testing that makes no distinction between front-facing and back-facing primitives during stencil testing. In other words, the stencil testing is independent of whether the primitives are front-facing or back-facing.

If same-sided stencil testing is not enabled, the primitives are passed without same-sided stencil testing and two-sided stencil testing. Note decision 506. If, on other hand, same-sided stencil testing is enabled, it is determined whether the graphics processing pipeline is operating with two-sided stencil testing enabled. See operation 508.

If it is determined in decision 510 that the two-sided stencil testing is disabled and the same-sided stencil testing is enabled, same-sided stencil testing is performed on the primitives in operation 512. If, however, the two-sided stencil testing is enabled and the same-sided stencil testing is enabled, two-sided stencil testing is performed on the primitives. In the context of the present description, the two-sided stencil testing refers to any testing involving stencil values, where results of the testing is a function as to whether the primitives are front-facing or back-facing. More information regarding an exemplary two-sided stencil testing scheme will be set forth in FIG. 6.

It should be noted that the present two-sided stencil testing technique may be utilized in the context of various applications. Note operation 514. Just by way of example, a shadow volume application may be utilized. More information regarding such application will be set forth in greater detail during reference to FIG. 7. Of course, various other applications may be implemented such as Constructive Solid Geometry (CSG), atmospheric lighting effects, etc.

Figure 6:
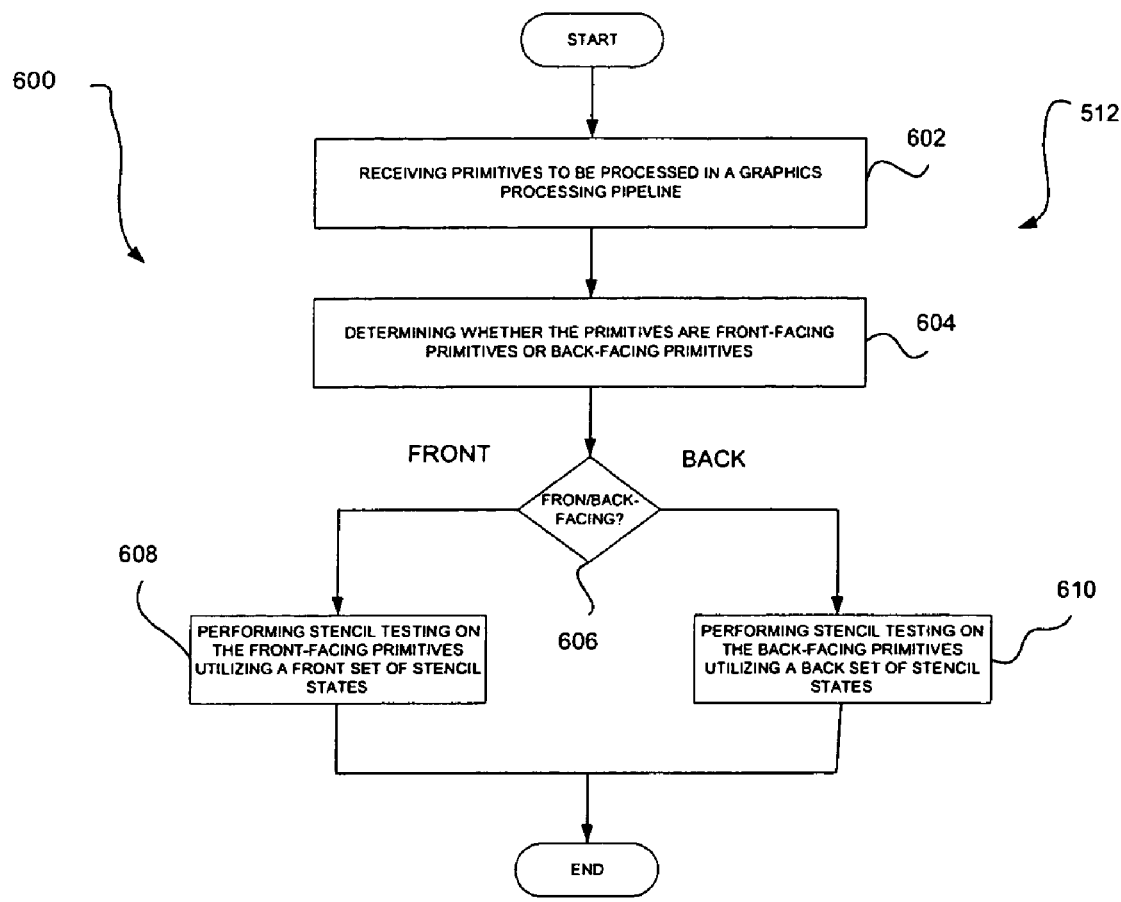
FIG. 6 illustrates a method of performing two-sided stencil testing, in accordance with the method of FIG. 5.

FIG. 6 illustrates a method 600 of performing two-sided stencil testing, in accordance with one embodiment. Note operation 512 of FIG. 5. Initially, in operation 602, primitives are received and identified. Upon primitives being received to be processed in the graphics processing pipeline, it is determined in operation 604 whether the primitives are front-facing primitives or back-facing primitives. As mentioned earlier, a primitive is front-facing or back-facing based on whether an area thereof is either positive or negative, or the ordering of vertices of the primitive is clockwise or counterclockwise.

As an option, the front-facing primitives and back-facing primitives may include front-facing polygon primitives and back-facing polygon primitives, respectively. The front-facing primitives may also include front-facing non-polygon primitives. Moreover, the front-facing non-polygon primitives may include points, lines, bitmaps, and image rectangles.

If it is determined that the primitives are front-facing in decision 606, stencil testing may be performed on the front-facing primitives utilizing a front set of stencil states. If, on the other hand, it is determined that the primitives are back-facing in decision 606, the stencil testing may be performed on the back-facing primitives utilizing a back set of stencil states. In one aspect of the present embodiment, the stencil states may include stencil operations, reference values, compare masks, compare functions, and write masks. Table 1 illustrates an exemplary front and back set of stencil states. It should be noted that such sets are set forth for illustrative purposes only, and should not be considered limiting in any manner.

TABLE 1

Front Stencil State

Stencil Fail Operation
Depth Fail Operation
Depth Pass Operation
Stencil Read Mask
Stencil Write Mask
Stencil Reference Value
Stencil Compare Function
Back Stencil State Stencil Fail Operation
Depth Fail Operation
Depth Pass Operation
Stencil Read Mask
Stencil Write Mask
Stencil Reference Value
Stencil Compare Function In various alternate embodiment, two copies of the states may not necessarily be required. Further, the states may be varied in various ways. Examples of stencil operations are increment (saturating and wrapping), decrement (saturating and wrapping), keep, replace, zero, and invert. Examples of stencil functions are less than, greater than, equal, not equal, less than or equal, greater than or equal, always, and never. A stencil write or read mask is a bit-mask. A stencil reference value is an integer value.

In use, the various states may be utilized in numerous ways in the context of different applications. In the context of the exemplary shadow volume application, the per-pixel stencil states may be incremented or decremented. In one embodiment, such incrementing and decrementing may include wrapping incrementing and wrapping decrementing, respectively. By tracking each of the above states for both front and back-facing primitives, the counting method 300 of prior art FIG. 3 may be performed with increased efficiency.

Variations on the above approach are possible to support multiple light sources. Variations on the ordering and operations of the algorithm are also possible. For example, incrementing on failed depth tests (rather than passed depth tests) for back-facing shadow volume primitives then decrementing on failed depth tests (rather than passed depth tests) for front-facing shadow volume primitives accomplishes an equivalent effect. Handling of special cases such as capping shadow volumes at the near or far clip planes may be necessary and may be handled appropriately.

Figure 7:
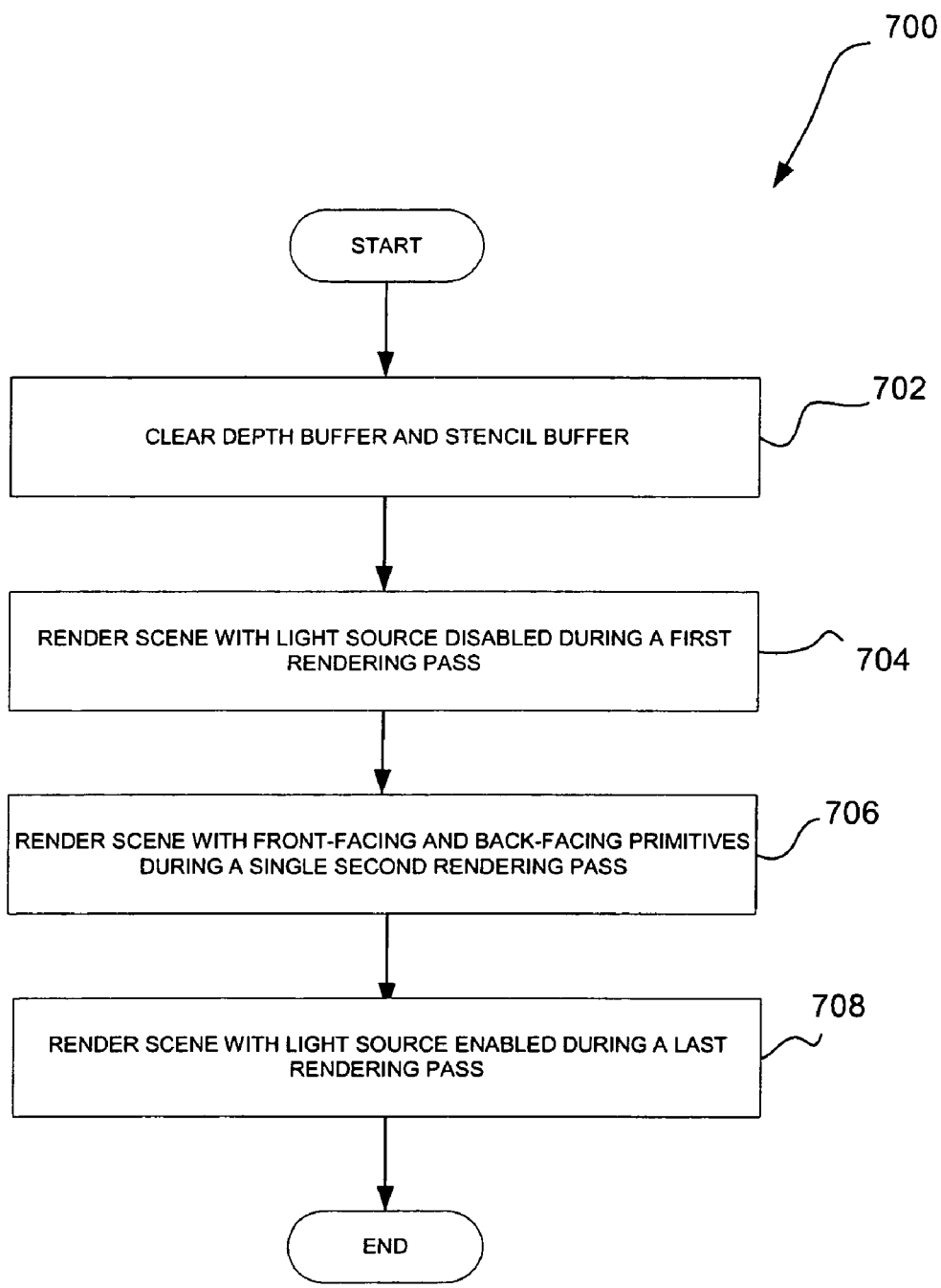
FIG. 7 illustrates the manner in which the counting method of Prior art FIG. 3 may be performed with increased efficiency utilizing the two-side stencil testing of FIG. 5.

FIG. 7 illustrates the manner in which the counting method 300 of Prior art FIG. 3 may be performed with increased efficiency. Again, it should be noted that the foregoing two-side stencil test has many applications only one of which is shadow volume counting. Initially, in operation 702, a depth buffer and a stencil buffer are cleared after which a scene is rendered with a light source disabled during a first rendering pass. Note operation 704.

Next, in operation 706, shadow volumes are drawn in the scene during a second rendering pass. Unlike the prior art method 300 of Prior art FIG. 3, neither the front-facing primitives nor the back-facing primitives are culled. Instead, both are rendered. This is made possible by the fact that separate states are monitored for both the front-facing primitives and the back-facing primitives.

The scene may then be rendered again during a final rendering pass in operation 708 with the light source 102 enabled. By the foregoing design, the two-sided stencil testing may be performed in a single pass, thus contributing to the efficiency of the overall system.

In situations that are CPU-limited, transform-limited, or setup-limited, two-sided stencil testing can be faster than conventional two-pass face culling rendering approaches. For example, if a lengthy vertex program is executed for every shadow volume vertex, rendering the shadow volume with a single two-sided stencil testing pass is advantageous.

An example of the present technique will now be set forth in the context of an embodiment where the OpenGL® programming language is utilized. Table 2 illustrates a configuration that may be used by an application that increments the stencil value for rasterized depth-test passing fragments of front-facing polygons and decrements the stencil value for rasterized fragments of depth-test passing back-facing polygons in a single pass. This corresponds to operation 706 in FIG. 7.

TABLE 2

```
glDepthMask(0);
glColorMask(0,0,0,0);
glDisable(GL_CULL_FACE);
glEnable(GL_STENCIL_TEST);
glEnable(GL_STENCIL_TEST_TWO_SIDE_NV);
glActiveStencilFaceNV(GL_BACK);
glStencilOp    (GL_KEEP,            // stencil test fail
                GL_KEEP,            // depth test fail
                GL_DECR_WRAP_EXT);  // depth test pass
glStencilMask(~0);
glStencilFunc(GL_ALWAYS, 0, ~0);
glActiveStencilFaceNV(GL_FRONT);
glStencilOp    (GL_KEEP,            // stencil test fail
                GL_KEEP,            // depth test fail
                GL_INCR_WRAP_EXT);  // depth test pass
glStencilMask(~0);
glStencilFunc(GL_ALWAYS, 0, ~0);
renderShadowVolumePolygons( );
```

As shown, the EXT_stencil_wrap operations, wrapping increment and wrapping decrement, may be used to avoid saturating decrements losing the shadow volume count. An alternative, using the conventional GL_INCR and GL_DECR operations, is to clear the stencil buffer to one half the stencil buffer value range, i.e. 128 for an 8-bit stencil buffer. In such case, a pixel is "in a shadow" if the final stencil value is greater than 128 and "out of a shadow" if the final stencil value is 128. While this does still create a potential for stencil value overflow if the stencil value saturates due to an increment or decrement, saturation is less likely with two-sided stencil testing than the conventional two-pass approach because front-facing and back-facing polygons are mixed together, rather than processing batches of front-facing before back-facing primitives.

Table 3 illustrates the manner in which the two-side stencil testing is enabled in accordance with FIG. 5.

TABLE 3

```
if (glIsEnabled(GL_STENCIL_TEST)) {
    if (glIsEnabled(GL_STENCIL_TEST_TWO_SIDE_NV) &&
primitiveType == polygon) {
        use two-sided stencil testing
    } else {
        use conventional stencil testing
    }
} else {
    no stencil testing
}
```

In order to interact with glPolygonMode, primitive type is determined by the begin mode so GL_TRIANGLES, GL_TRIANGLE_STRIP, GL_QUAD_STRIP, GL_QUADS, GL_TRIANGLE_FAN, and GL_POLYGON generate polygon primitives. If the polygon mode is set such that lines or points are rasterized, two-sided stencil testing still operates based on the original polygon facingness if stencil testing and two-sided stencil testing are enabled.

The present stencil test thus conditionally discards a fragment based on the outcome of a comparison between the value in the stencil buffer at location (x,y) and a reference value.

Stencil testing is enabled or disabled with the glEnable and glDisable commands, using the symbolic constant GL_STENCIL_TEST. When stencil testing is disabled, the stencil test and associated modifications are not made, and the fragment is passed.

In use, the stencil testing may operate in a two-sided mode. Two-sided stencil testing is enabled or disabled with the glEnable and glDisable commands, using the symbolic constant GL_STENCIL_TEST_TWO_SIDE_NV. When stencil testing is disabled, the state of two-sided stencil testing does not affect fragment processing.

There are two sets of stencil-related states, the front stencil state set and the back stencil state set. When two-sided stencil testing is enabled, stencil tests and writes use the front set of stencil state when processing fragments rasterized from non-polygon primitives (points, lines, bitmaps, image rectangles) and front-facing polygon primitives while the back set of stencil state is used when processing fragments rasterized from back-facing polygon primitives.

For the purposes of two-sided stencil testing, a primitive is still considered a polygon even if the polygon is to be rasterized as points or lines due to the current polygon mode. Whether a polygon is front-facing or back-facing is determined in the same manner used for two-sided lighting and face culling. Otherwise when two-sided stencil testing is disabled, the front set of stencil state is used when stencil testing fragments.

The active stencil face determines whether stencil-related commands update the front or back stencil state. The active stencil face is set with a new function: void glActiveStencilFace(GLenum face), where face is either GL_FRONT or GL_BACK. Stencil commands (glStencilFunc, glStencilOp, and glStencilMask) that update the stencil state update the front stencil state if the active stencil face is GL_FRONT and the back stencil state if the active stencil face is GL_BACK. Additionally, queries of stencil state return the front or back stencil state depending on the current active stencil face.

The stencil test state is controlled with the functions: void glStencilFunc(GLenum func, GLint ref, GLuint mask), and void glStencilOp(GLenum sfail, GLenum dpfail, GLenum dppass).

In the initial state, stencil testing and two-sided stencil testing are both disabled, the front and back stencil reference values are both zero, the front and back stencil comparison functions are GL_ALWAYS, and the front and back stencil mask are both all ones. Initially, both the three front and the three back stencil operations are GL_KEEP.

The initial state is for both the front and back stencil plane mask to be all ones. The clear operation uses the front stencil write mask when clearing the stencil buffer.

When writing stencil values with glDrawPixels or glCopyPixels, each stencil index is written to its indicated location in the framebuffer, subject to the current front stencil mask state (set with glStencilMask).

Table 4 shows a new GL rendering command that may be added for being sent to the server as part of a glXRender request.

TABLE 4

ActiveStencilFaceNV

| 2 | 8 | rendering command length |
|---|---|---|
| 2 | ???? | rendering command opcode |
| 4 | ENUM | face |

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A method for two-sided stencil testing during graphics processing, comprising:
   (a) receiving primitives to be processed in a graphics processing pipeline;
   (b) determining whether the primitives are front-facing primitives or back-facing primitives;
   (c) performing two-sided stencil testing on the primitives, comprising:
      (i) performing stencil testing on a subset of the primitives that are front-facing primitives utilizing a front set of stencil states;
      (ii) performing stencil testing on a subset of the primitives that are back-facing primitives utilizing a back set of stencil states;
         said front set of stencil states used for stencil testing said front-facing primitives and said back set of stencil states used for stencil testing said back-facing primitives being separate sets of states that are independently selectable and wherein both received front-facing primitives and back-facing primitives are rendered in a single rendering pass; and
   (d) displaying a result of said graphics processing utilizing said two-sided stencil testing.

2. A method for two-sided stencil testing in a graphics system, comprising:
   determining whether a primitive is a front-facing primitive or a back-facing primitive;
   in response to determining that the primitive is a front-facing primitive, performing stencil testing utilizing a front set of stencil states;
   in response to determining that the primitive is a back-facing primitive, executing stencil testing utilizing a back set of stencil states;
   said front set of stencil states used for stencil testing said front-facing primitives and said back set of stencil states used for stencil testing said back-facing primitives being separate sets of states that are independently selectable and wherein both front-facing primitive and back-facing primitives are rendered in a single rendering pass; and
   displaying a result of said graphics processing utilizing said two-sided stencil testing.

3. The method of claim 2, wherein said performing stencil testing comprises: testing at least one of stencil operations, reference values, compare masks, compare functions, and write masks.

4. The method of claim 2, wherein said executing stencil testing comprises: testing at least one of stencil operations, reference values, compare masks, compare functions, and write masks.

* * * * *